Patented Mar. 27, 1934

1,952,122

UNITED STATES PATENT OFFICE 1,952,122

PROCESS FOR THE INHIBITION OF HALOGEN SUBSTITUTION REACTIONS

Richard M. Deanesly, Berkeley, Calif., assignor to Shell Development Company, San Francisco, Calif., a corporation of Delaware No Drawing. Application November 11, 1931, Serial No. 574,462

17 Claims. (Cl. 260—166)

This invention relates to the modification or control of substitution reactions and more particularly is adapted for mixed phase operations in which it is desired to execute an addition reaction without any or substantial substitution reaction simultaneously taking place.

The substitution reaction, as is generally agreed in the case of hydrogen and halogen (for example chlorine), is governed by a chain mechanism. This chain mechanism is stimulated or induced either by light or by enhanced temperature or by the presence of an addition process (i. e. when olefines, diolefines, terpenes are present). Oxygen acts as a chain breaker and thereby as an inhibitor of the substitution reaction, so that in the presence of oxygen a greater intensity of stimulation is necessary to maintain a given degree of reaction between saturated organic compounds (alkyl, aryl or aralkyl) and chlorine. That is, a greater intensity of light than the minimum, or a greater concentration of olefines than the minimum, or a higher temperature than otherwise, is required to support continued reaction. The higher the concentration of oxygen, the higher must be the concentration of stimulant to counteract the inhibitory effect of oxygen. The inhibiting action of oxygen is about proportional to its concentration.

I have discovered that substantially exact control may be had in carrying out the addition reaction of halogen to unsaturated compounds by adding thereto oxygen. When the unsaturated compound or compounds or mixtures containing one or more unsaturated compounds admixed with saturated compounds are treated with halogen in the presence of free oxygen, the latter tends to reduce the proportion of products which are formed by substitution reactions. For example, resort may be had to the above in the chlorination of an olefine in order to reduce the proportion (otherwise not inconsiderable) of trichlor—and heavier derivatives which are formed by substitution of chlorine into the dichlor derivative. The amount of oxygen required is dependent solely on the requirements of the operator—varying with practical features of economy, design of plant and the like. The effect is not merely a dilution of the reaction by inert gas but an active inhibition of the reaction by oxygen.

The above conclusion is fully corroborated by the following set of examples which are presented for illustrative purposes only.

Example 1

A mixture of 83% butane and 17% butylene was continuously chlorinated in total darkness. Chlorine was being introduced at a rate of 120 grams per hour into a reflux of the above mixture in a rectifying column equivalent to about four molecules of hydrocarbon to every one of chlorine passing the chlorine inlet in a given time. The stillhead thermometer than showed $-1.0°$ C. and the thermometer at the reaction zone $20.5°$ C. Inspection of the column showed that the reflux was substantially colorless throughout. Oxygen was then introduced through the same inlet as the chlorine without altering in any other respect the flow of reactants. The rate of flow of oxygen was 13 liters per hour. After one and a half minutes, the stillhead thermometer had fallen to $-7.0°$ C., and was continuing to fall owing to the accumulation of unreacted chlorine there. The reaction zone thermometer had fallen to $+6.8°$ C. and the column was deeply colored with chlorine from the chlorine inlet upwards. Immediately on stopping the flow of oxygen, the previous conditions of temperature were resumed and the accumulation of chlorine in the column disappeared again in three minutes.

Example 2

The experiment was then repeated using air in place of oxygen. Air flow was gradually increased until the same degree of lowering of the reaction zone temperature was observed; the air flow required was 61 liters per hour, or approximately five times that of oxygen.

In the above examples, the oxygen was substantially unconsumed, at any rate not consumed in any ordinary stoichiometric proportion. Combined oxygen was not detected in the reaction products.

When a mixture of any of the enumerated types of unsaturated compounds with a saturated organic compound of the nature of benzene and its homologues, methane and its homologues, or a combined type of the aralkyl order as toluene and its homologues is to be treated solely for the addition products, substitution of the saturated alkyl, aryl or aralkyl compounds may be reduced or inhibited by the use of oxygen, air, an oxygen containing gas or by the utilization of some substance which will evolve oxygen during the reaction. For example, oxygen may be employed when chlorinating a mixture of olefine and paraffin to reduce or inhibit substitution of the paraffin and so obtain better yields of dichlor derivatives.

The following examples emphasize the influence of oxygen on both the substitution and addition reactions and are cited for illustrative purposes only.

*Example 3*

A mixture of 56.6% beta-butylene and 43.4% normal butane was chlorinated, a certain amount of air being recycled in a closed system through the reaction column. There was no sign that the small amount of air present, about four liters, was consumed during the ten hours run. Of the butane introduced during this run (10.4 gm. mols.), only 2.25 gm. mols were converted into chloride, whereas 11.5 gm. mols of dichlorbutane were obtained from 13.5 of butylene. The remainder of the butane was found unreacted at the end of the experiment. Normally in the absence of air or oxygen in the presence of more than 10% of butylene the whole of the butane is chlorinated. This experiment further indicates that it is only the substitution reaction which is impeded by oxygen; the addition reaction proceeds without noticeable change in rate.

*Example 4*

In another experiment in which a certain unknown amount of air was recycled through the column during the chlorination, pure normal butane was chlorinated in the presence of light. It was found that the usual rate of consumption of chlorine for that apparatus (around 120 gm. per hour) could not be maintained unless the light intensity was about forty times that used in former experiments (e. g. a 500 watt lamp at a distance of 3" to 4" from the column instead of the same lamp 24" distant from the column).

This process is adapted to any reactions where halogen whether present as reagent or product of the reaction is liable to take part in an undesired substitution reaction.

According to my process, the rate and direction of halogenation may be controlled through the amount and nature of the oxygen containing medium present in the apparatus per unit of time.

While I have in the foregoing described in some detail the preferred embodiment of my invention and some variants thereof, it will be understood that this is only for the purpose of making the invention more clear and that the invention is not to be regarded as limited to the details of operation described, nor is it dependent upon the soundness or accuracy of the theories which I have advanced as to the reasons for the advantageous results attained. On the other hand, the invention is to be regarded as limited only by the terms of the accompanying claims, in which it is my intention to claim all novelty inherent therein as broadly as is possible in view of the prior art.

I claim as my invention:

1. The process of conducting addition reactions while substantially inhibiting substitution reactions, comprising, reacting an unsaturated hydrocarbon with substantially pure halogen in the deliberate presence of free oxygen in such an amount as to practically inhibit any halo-substitution reaction without substantially increasing the temperature of operation above that normally employed in the halo-addition reaction.

2. The process of conducting addition reactions while substantially inhibiting substitution reactions, comprising, reacting an unsaturated hydrocarbon with substantially pure chlorine in the deliberate presence of a free oxygen-containing gas which contains more than 21% by volume of oxygen in such an amount as to practically inhibit any chlor-substitution reaction without substantially increasing the temperature of operation above that normally employed in the chlor-addition reaction.

3. The process of conducting addition reactions while substantially inhibiting substitution reactions, comprising, reacting a secondary olefine with halogen in the presence of oxygen at a temperature not substantially greater than room temperature.

4. The process of conducting addition reactions while substantially inhibiting substitution reactions, comprising, reacting a secondary olefine with chlorine in the deliberate presence of free oxygen in such an amount as to practically inhibit any chlor-substitution reaction without substantially increasing the temperature of operation above that normally employed in the chlor-addition reaction.

5. The process of conducting addition reactions while substantially inhibiting substitution reactions, comprising, reacting a mixture of unsaturated and saturated hydrocarbons with halogen in the deliberate presence of free oxygen in such an amount as to practically inhibit any halo-substitution reaction without substantially increasing the temperature of operation above that normally employed in the halo-addition reaction.

6. The process of conducting addition reactions while substantially inhibiting substitution reactions, comprising, reacting a mixture of unsaturated and saturated hydrocarbons with chlorine in the deliberate presence of free oxygen in such an amount as to practically inhibit anay chlor-substitution reaction without substantially increasing the temperature of operation above that normally employed in the chlor-addition reaction.

7. The process of conducting addition reactions while substantially inhibiting substitution reactions, comprising, reacting a mixture of a secondary olefine and saturated hydrocarbon with halogen in the deliberate presence of a free oxygen-containing gas which contains more than 21% by volume of oxygen in such an amount as to practically inhibit any halo-substitution reaction without substantially increasing the temperature of operation above that normally employed in the halo-addition reaction.

8. The process of conducting addition reactions while substantially inhibiting substitution reactions, comprising, reacting a mixture of a secondary olefine and saturated hydrocarbon with chlorine in the deliberate presence of oxygen at a temperature not substantially greater than room temperature.

9. The process of conducting addition reactions while substantially inhibiting substitution reactions, comprising, reacting a mixture of olefine and paraffin hydrocarbons with halogen in the deliberate presence of free oxygen in such an amount as to practically inhibit any halo-substitution reaction without substantially increasing the temperature of operation above that normally employed in the halo-addition reaction.

10. The process of conducting addition reactions while substantially inhibiting substitution reactions, comprising, reacting a mixture of secondary olefine and paraffin hydrocarbons with chlorine in the deliberate presence of free oxygen in such an amount as to practically inhibit any chlor-substitution reaction without substantially increasing the temperature of operation above that normally employed in the chlor-addition reaction.

11. The process of conducting addition reactions while substantially inhibiting substitution reactions, comprising, reacting a mixture of an unsaturated hydrocarbon and a saturated aromatic hydrocarbon with halogen in the deliberate presence of oxygen.

12. The process of conducting addition reactions while substantially inhibiting substitution reactions, comprising, reacting a mixture of an unsaturated hydrocarbon and a saturated aromatic hydrocarbon with chlorine in the deliberate presence of oxygen.

13. The process of conducting addition reactions while substantially inhibiting substitution reactions, comprising, reacting a mixture of a secondary olefin and a saturated aromatic hydrocarbon with halogen in the deliberate presence of oxygen.

14. The process of conducting addition reactions while substantially inhibiting substitution reactions, comprising, reacting a mixture of a secondary olefin and a saturated aromatic hydrocarbon with chlorine in the deliberate presence of oxygen.

15. The process of conducting addition reactions while substantially inhibiting substitution reactions which comprises reacting a hydrocarbon fraction consisting predominantly of paraffin and olefine hydrocarbons containing more than three carbon atoms to the molecule with chlorine while deliberately executing the reaction in the presence of free oxygen in such an amount as to practically inhibit any chlor-substitution reaction without substantially increasing the temperature of operation above that normally employed in the chlor-addition reaction.

16. The process of conducting addition reactions while substantially inhibiting substitution reactions which comprises reacting a hydrocarbon fraction consisting predominantly of paraffin and olefine hydrocarbons containing the same number of carbon atoms to the molecule with chlorine while deliberately executing the reaction in the presence of free oxygen in such an amount as to practically inhibit any chlor-substitution reaction without substantially increasing the temperature of operation above that normally employed in the chlor-addition reaction.

17. The process of conducting addition reactions while substantially inhibiting substitution reactions which comprises reacting a hydrocarbon fraction consisting predominantly of butane and butene with chlorine while deliberately executing the reaction in the presence of free oxygen.

RICHARD M. DEANESLY.

DISCLAIMER 1,952,122.—*Richard M. Deanesly*, Berkeley, Calif. PROCESS FOR THE INHIBITION OF HALOGEN SUBSTITUTION REACTIONS. Patent dated March 27, 1934. Disclaimer filed April 16, 1937, by the assignee, *Shell Development Company*.

Hereby enters this disclaimer to so much of claim 1 of said Letters Patent as is in excess of the following:

The process of conducting addition reactions while substantially inhibiting substitution reactions, comprising, reacting an unsaturated hydrocarbon *containing at least three carbon atoms* with substantially pure halogen in the deliberate presence of free oxygen in such an amount as to practically inhibit any halo-substitution reaction without substantially increasing the temperature of operation above that normally employed in the halo-addition reaction;

and also hereby enters this disclaimer to so much of claim 2 of said Letters Patent as is in excess of the following:

The process of conducting addition reactions while substantially inhibiting substitution reactions, comprising, reacting an unsaturated hydrocarbon *containing at least three carbon atoms* with substantially pure chlorine in the deliberate presence of a free oxygen-containing gas which contains more than 21% by volume of oxygen in such an amount as to practically inhibit any chlor-substitution reaction without substantially increasing the temperature of operation above that normally employed in the chlor-addition reaction.

[*Official Gazette May 18, 1937.*]

11. The process of conducting addition reactions while substantially inhibiting substitution reactions, comprising, reacting a mixture of an unsaturated hydrocarbon and a saturated aromatic hydrocarbon with halogen in the deliberate presence of oxygen.

12. The process of conducting addition reactions while substantially inhibiting substitution reactions, comprising, reacting a mixture of an unsaturated hydrocarbon and a saturated aromatic hydrocarbon with chlorine in the deliberate presence of oxygen.

13. The process of conducting addition reactions while substantially inhibiting substitution reactions, comprising, reacting a mixture of a secondary olefin and a saturated aromatic hydrocarbon with halogen in the deliberate presence of oxygen.

14. The process of conducting addition reactions while substantially inhibiting substitution reactions, comprising, reacting a mixture of a secondary olefin and a saturated aromatic hydrocarbon with chlorine in the deliberate presence of oxygen.

15. The process of conducting addition reactions while substantially inhibiting substitution reactions which comprises reacting a hydrocarbon fraction consisting predominantly of paraffin and olefine hydrocarbons containing more than three carbon atoms to the molecule with chlorine while deliberately executing the reaction in the presence of free oxygen in such an amount as to practically inhibit any chlor-substitution reaction without substantially increasing the temperature of operation above that normally employed in the chlor-addition reaction.

16. The process of conducting addition reactions while substantially inhibiting substitution reactions which comprises reacting a hydrocarbon fraction consisting predominantly of paraffin and olefine hydrocarbons containing the same number of carbon atoms to the molecule with chlorine while deliberately executing the reaction in the presence of free oxygen in such an amount as to practically inhibit any chlor-substitution reaction without substantially increasing the temperature of operation above that normally employed in the chlor-addition reaction.

17. The process of conducting addition reactions while substantially inhibiting substitution reactions which comprises reacting a hydrocarbon fraction consisting predominantly of butane and butene with chlorine while deliberately executing the reaction in the presence of free oxygen.

RICHARD M. DEANESLY.

DISCLAIMER 1,952,122.—*Richard M. Deanesly*, Berkeley, Calif. PROCESS FOR THE INHIBITION OF HALOGEN SUBSTITUTION REACTIONS. Patent dated March 27, 1934. Disclaimer filed April 16, 1937, by the assignee, *Shell Development Company*.

Hereby enters this disclaimer to so much of claim 1 of said Letters Patent as is in excess of the following:

The process of conducting addition reactions while substantially inhibiting substitution reactions, comprising, reacting an unsaturated hydrocarbon *containing at least three carbon atoms* with substantially pure halogen in the deliberate presence of free oxygen in such an amount as to practically inhibit any halo-substitution reaction without substantially increasing the temperature of operation above that normally employed in the halo-addition reaction;

and also hereby enters this disclaimer to so much of claim 2 of said Letters Patent as is in excess of the following:

The process of conducting addition reactions while substantially inhibiting substitution reactions, comprising, reacting an unsaturated hydrocarbon *containing at least three carbon atoms* with substantially pure chlorine in the deliberate presence of a free oxygen-containing gas which contains more than 21% by volume of oxygen in such an amount as to practically inhibit any chlor-substitution reaction without substantially increasing the temperature of operation above that normally employed in the chlor-addition reaction.

[*Official Gazette May 18, 1937.*]